M. DUDLEY.
Assignor by mesne assignments to I. B. KEITH and J. C. BENNETT.
MACHINERY FOR BURNISHING THE SOLE EDGES OF BOOTS AND SHOES.
No. 10,250. Reissued Nov. 28, 1882.
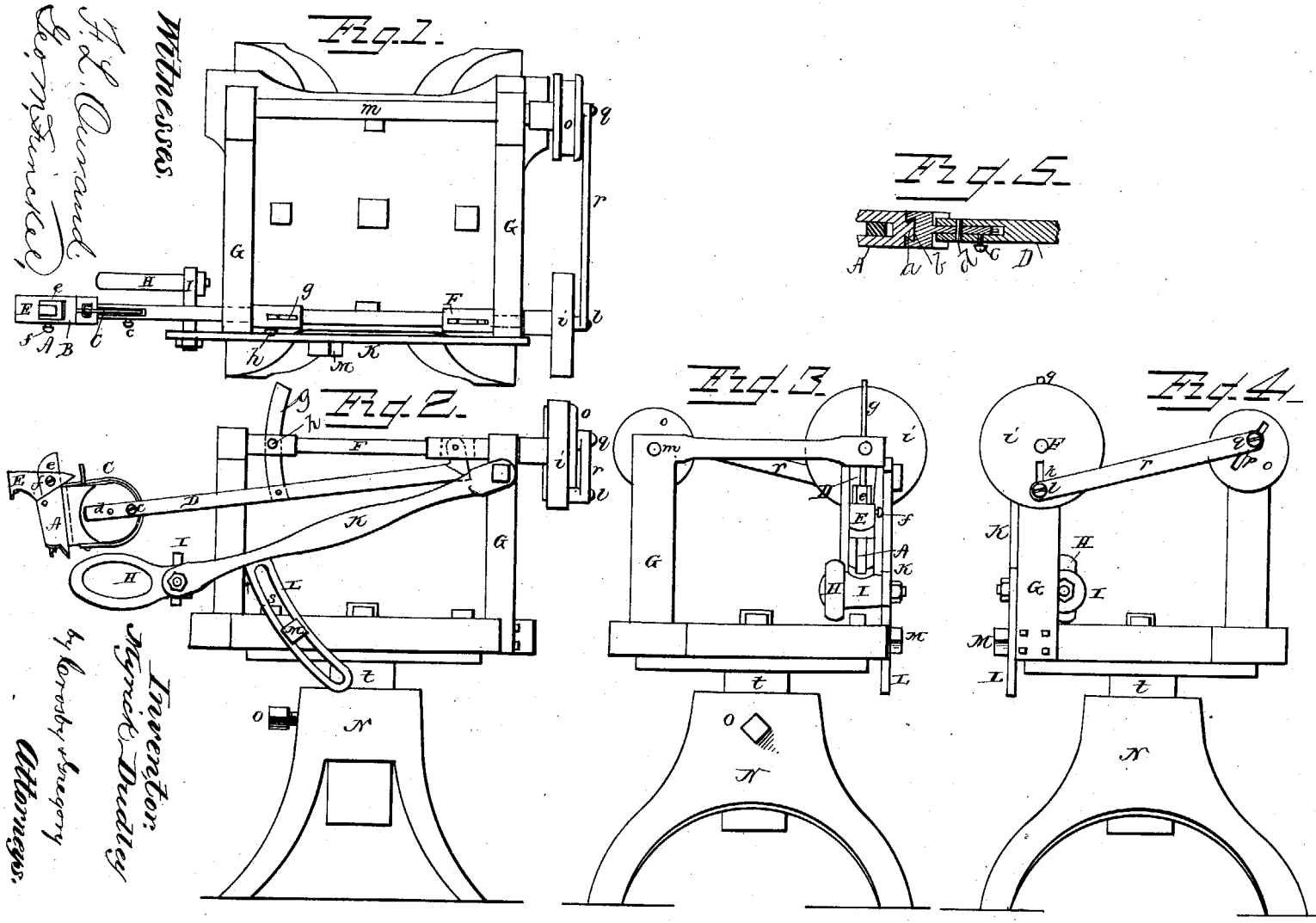
Witnesses.
F. L. Ourand.
Geo. M. Finckel,
Inventor.
Myrick Dudley
by Crosby & Gregory
Attorneys.
N. PETERS, Photo-Lithographer, Washington, D. C

UNITED STATES PATENT OFFICE.

MYRICK DUDLEY, OF LYNN, MASS., ASSIGNOR, BY MESNE ASSIGNMENTS, TO IRA B. KEITH AND JOSIAH C. BENNETT, OF SAME PLACE.

MACHINERY FOR BURNISHING THE SOLE-EDGES OF BOOTS AND SHOES.

SPECIFICATION forming part of Reissued Letters Patent No. 10,250, dated November 28, 1882.

Original No. 255,152, dated March 21, 1882. Application for reissue filed September 2, 1882.

*To all whom it may concern:*

Be it known that I, MYRICK DUDLEY, of Linn, county of Essex, and State of Massachusetts, have invented a new and useful Improvement in Machinery for Finishing or Burnishing the Edges of the Fore Parts and Shanks of Shoes; and I do hereby declare the same to be described in the following specification and represented in the accompanying drawings, of which—

Figure 1 is a top view, Fig. 2 a front elevation, Figs. 3 and 4 end views, of a machine embodying my invention, the nature of which is hereinafter explained, and particularly set forth, especially in the claims as presented; and Fig. 5 is a detail to be hereinafter explained.

In such drawings, A denotes a sole-edge finisher or burnisher, which may be supposed to be substantially like that described in Letters Patent No. 246,944, granted September 13, 1881, on an invention made by me. The finisher is connected with a carrier, B, so as to slide up and down on and relatively thereto, such adaptation being by means of a dovetailed tongue, *a*, projecting from the one into a dovetailed groove, *b*, in the other, as shown in Fig. 5, which is a transverse section of the finisher and its carrier. A spring, C, fixed to the carrier and arranged therewith, as shown, bears on the upper part of, and thus affords an elastic support for, the said finisher. The carrier projects into and is pivoted to a forked arm, D, which has in one of its prongs a set-screw, *c*, which, arranged as represented, with the joint-pin *d* of the carrier and arm, serves to clamp the carrier to the arm. By means of the carrier applied, as described, to the arm the inclination of the fore-part or edge finisher can be varied more or less in the plane of the carrier. From the upper part of the said finisher a tenon, *e*, projects through a mortise in a shank burnisher or finisher, E, arranged with the finisher A, as represented, and held thereto by a set-screw, *f*, screwed into the said finisher E and against the said tenon. The forked arm D at its rear part is jointed to a rocker-shaft, F, supported by a frame, G. From the forked arm a curved bar, *g*, extends through the rocker-shaft, the latter being provided with a clamp-screw, *h*, to bear against the bar *g*. By adjusting the arm D by means of the bar *g* and screw *h* nearer to or farther from the rocker-shaft I can vary the extent of vibratory motion imparted to the finisher by the shaft, which, when in operation, has a reciprocating rotary movement.

Fixed on the rocker-shaft F is a disk, *i*, provided with a radial slot, *k*, having in it a crank-pin, *l*, which should be adjustable radially in the said slot.

On a driving-shaft, *m*, arranged, as shown, in the frame G, there is a fixed pulley, *o*, provided with a diametric slot, *p*, having in it a crank-pin, *q*, adjustable radially in the said slot. A connecting-rod, *r*, turns on the said two crank-pins. The two shafts F and *m* are supported in bearings in the frame G.

H is a finger-rest adapted to swivel or turn in an ear, I, projecting from a radial arm, K. This arm K, pivoted at its rear part to the frame G, has a curved and slotted bar, L, extending upward from it. A clamp-screw, M, goes through the slot *s* of the bar L and screws into the frame G, from which a tenon, *t*, projects into or through a mortise in a stand, N. A set-screw, O, screwed into the stand and against the tenon, serves to confine the tenon at any altitude in the stand.

By having the crank-pins *l* and *q* adjustable nearer to or farther from the axes of the shafts F and *m*, I can vary the extent of the reciprocating motion of the rocker-shaft, and consequently that of the edge-finisher. Each of the crank-pins *l* and *q* is to be supposed to be provided with means for clamping it in any position in which it may be adjusted in its sustaining-slot.

I have herein shown means for imparting to the burnishers or finishers vibrating motion, and for regulating the extent of such vibrations as circumstances may require; and, besides, I have means for adjusting the finger-rest in a vertical plane and of turning it laterally, in order to bring it into a convenient position relatively to the burnisher or finisher.

By adjusting the arm D more or less distant from the shaft F and confining it by screw *h*, I can vary the length of stroke of the burnisher without altering the throw of the said shaft.

I claim—

1. The rocker-shaft and its connected parallel arm D and attached fore-part finisher A, combined with the shank-finisher connected therewith, substantially as described.

2. The combination of the carrier B and its spring C with the fore-part finisher A, adapted thereto, as described, and with the shank-finisher E, supported by or fixed to the finisher A, all being substantially as set forth.

3. The rock-shaft F and the pivoted arm D, made adjustable with relation to and actuated by the said rock-shaft, combined with the burnisher or finisher, and with the swiveling finger-rest, substantially as described.

4. In a burnishing-machine, the rocking shaft F, the arm D, parallel with and carried by it, and the connected burnishing-tool, combined with the finger-rest, adapted to turn or swivel about an axis parallel with the shaft F, and made vertically adjustable, substantially as described.

5. The combination of the finisher-carrier B and the rocker-shaft F with the arm D, applied to them, substantially as described, the said shaft and arm D having clamp-screws attached to them, as explained.

6. The combination of the connecting-rod *r* and the driving-pulley *o* and disk *i*, provided with crank-pins *l* and *q*, adjustable in them, as set forth, with the shafts *m* F, and with the finisher-carrier supporting-arm D, applied to the rocker-shaft F, so as to be adjustable therewith, substantially as specified.

7. The combination of the ear I and the radial arm K, its slotted bar L, and clamp-screw M with the finger-rest H, all being arranged substantially as set forth.

8. The horizontal rocker-shaft F, combined with its attached arm D, parallel with the rocker-shaft, the burnisher or finisher carried by the said arm, and the connecting-bar *g*, between the said shaft and arm, to operate substantially as described.

MYRICK DUDLEY.

Witnesses:

IRA B. KEITH,

J. EDWIN BARTLETT.